(12) United States Patent
Yamanashi et al.

(10) Patent No.: US 12,412,594 B2
(45) Date of Patent: Sep. 9, 2025

(54) AUDIO PROCESSING SYSTEM, AUDIO PROCESSING DEVICE, AND AUDIO PROCESSING METHOD

(71) Applicant: Panasonic Intellectual Property Management Co., Ltd., Osaka (JP)

(72) Inventors: Tomofumi Yamanashi, Kanagawa (JP); Naoya Mochiki, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 303 days.

(21) Appl. No.: 18/160,857

(22) Filed: Jan. 27, 2023

(65) Prior Publication Data

US 2023/0178093 A1    Jun. 8, 2023

Related U.S. Application Data

(63) Continuation of application No. PCT/JP2021/016088, filed on Apr. 20, 2021.

(30) Foreign Application Priority Data

Sep. 18, 2020    (JP) .................................. 2020-157743

(51) Int. Cl.
*G10L 15/24*    (2013.01)
*G10L 15/22*    (2006.01)
*G10L 21/028*    (2013.01)

(52) U.S. Cl.
CPC ............ *G10L 21/028* (2013.01); *G10L 15/22* (2013.01); *G10L 2015/223* (2013.01)

(58) Field of Classification Search
USPC .................. 701/300–302, 400–539, 1–33.7; 704/1–275; 706/1–62, 900–903
See application file for complete search history.

(56) References Cited

U.S. PATENT DOCUMENTS

| | | | |
|---|---|---|---|
| 2008/0140400 A1* | 6/2008 | Blass | ...................... G10L 15/22 704/E15.04 |
| 2017/0161016 A1 | 6/2017 | McDunn et al. | |
| 2018/0047394 A1* | 2/2018 | Tian | ........................ G10L 15/24 |

FOREIGN PATENT DOCUMENTS

| | | |
|---|---|---|
| JP | 2001034454 A | 2/2001 |
| JP | 2017090611 A | 5/2017 |

OTHER PUBLICATIONS

Totsuka Noriko; Information Processing Device, Information Processing Method, Program, and Moving Body; 2019 (Year: 2019).*

(Continued)

*Primary Examiner* — Marcellus J Augustin
(74) *Attorney, Agent, or Firm* — Seed Intellectual Property Law Group LLP (57) ABSTRACT

An audio processing system includes a memory, and a processor. The processor is coupled to the memory, and, when executing a program stored in the memory, performs: receiving a first voice that is a voice uttered by a first speaker; determining whether or not a position of the first speaker can be identified; and outputting, to a target device, a voice command that is specified by a voice and is a signal for controlling the target device, the processor limiting output of a speaker position command related to a position of a speaker among the voice command in a case where the processor determines that the position of the first speaker cannot be identified.

12 Claims, 6 Drawing Sheets

(56) References Cited

OTHER PUBLICATIONS

Buck Marku; Vehicle Speech Recognition System; 2006 (Year: 2006).*
Tsujikawa Yoshinori; Audio Processing System, Audio Processing Method, Audio Processing Program, Vehicle Equipped With Audio Processing System, and Microphone Installation Method; 2017 (Year: 2017).*
International Search Report, mailed Jul. 27, 2021, for International Application No. PCT/JP2021/016088, 2 pages.

* cited by examiner

AUDIO PROCESSING SYSTEM, AUDIO PROCESSING DEVICE, AND AUDIO PROCESSING METHOD

CROSS-REFERENCE TO RELATED APPLICATIONS

This application is a continuation of International Application No. PCT/JP2021/016088, filed on Apr. 20, 2021 which claims the benefit of priority of the prior Japanese Patent Application No. 2020-157743, filed on Sep. 18, 2020, the entire contents of which are incorporated herein by reference.

FIELD

The present disclosure relates to an audio processing system, an audio processing device, and an audio processing method.

BACKGROUND

An audio processing system that processes a voice recognition command on the basis of a voice uttered by a speaker is known.

JP 2017-90611 A discloses an audio processing system that processes a voice recognition command on the basis of a position where a speaker uttered.

However, Patent Literature 1 does not disclose control in a case where the position of the speaker cannot be identified. If it is not assumed that the position of the speaker cannot be identified, the audio processing system may execute unintended processing.

An object of the present disclosure is to execute appropriate processing even in a case where a position of a speaker cannot be identified in an audio processing system.

SUMMARY

An audio processing system according to the present disclosure includes a memory, and a processor. The processor is coupled to the memory, and, when executing a program stored in the memory, performs: receiving a first voice that is a voice uttered by a first speaker; determining whether or not a position of the first speaker can be identified; and outputting, to a target device, a voice command that is specified by a voice and is a signal for controlling the target device, the processor limiting output of a speaker position command related to a position of a speaker among the voice command in a case where the processor determines that the position of the first speaker cannot be identified.

DETAILED DESCRIPTION

Hereinafter, embodiments of the present disclosure will be described in detail with reference to the drawings as appropriate. However, unnecessarily detailed description may be omitted. Note that the accompanying drawings and the following description are provided for those skilled in the art to fully understand the present disclosure, and are not intended to limit the subject matter described in the claims.

First Embodiment

Figure 1:
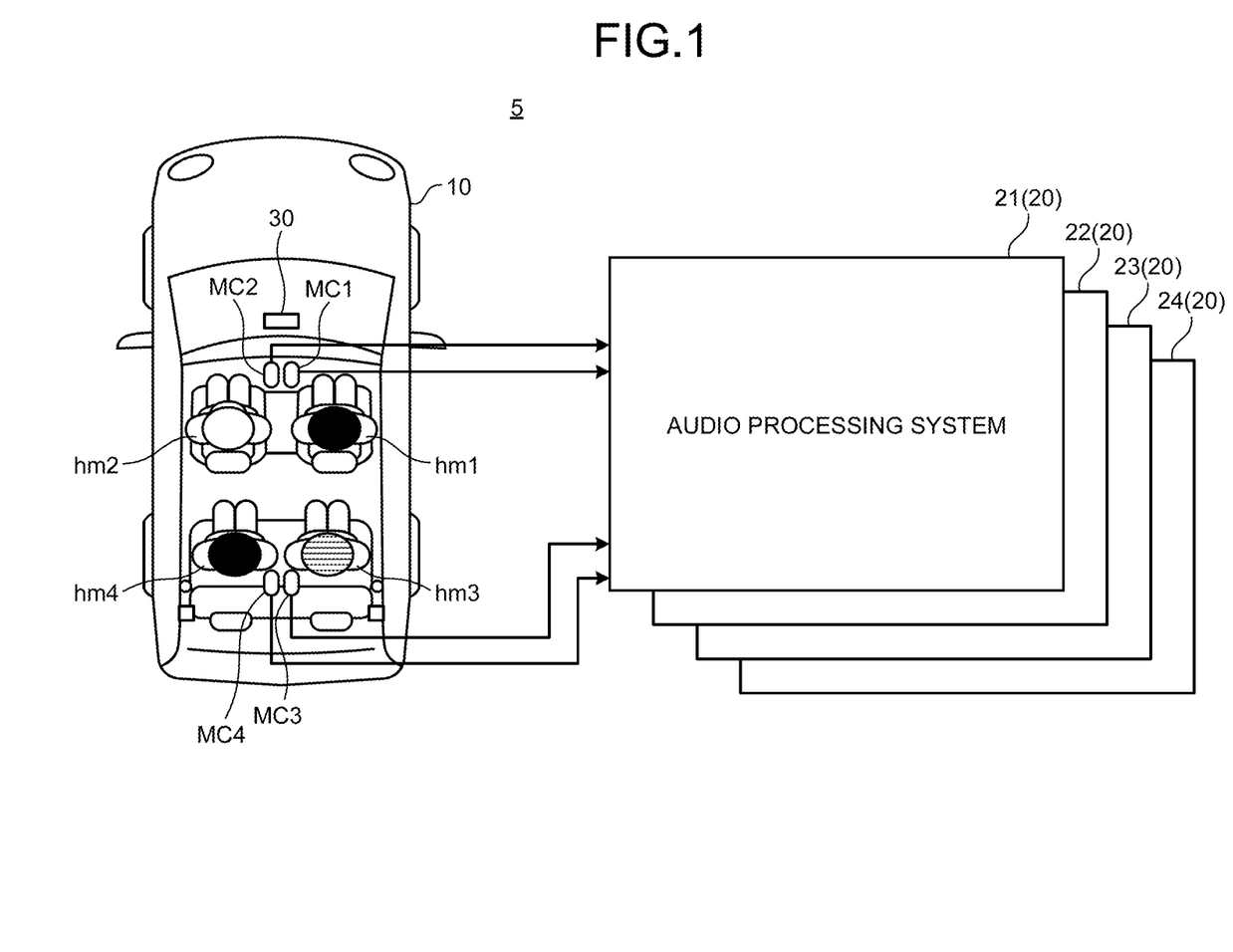
FIG. 1 is a diagram illustrating an example of a schematic configuration of an in-vehicle audio processing system according to a first embodiment.

FIG. 1 is a diagram illustrating an example of a schematic configuration of an audio system 5 according to a first embodiment. The audio system 5 is mounted on a vehicle 10, for example. Hereinafter, an example in which the audio system 5 is mounted on the vehicle 10 will be described.

A plurality of seats are provided in an interior of the vehicle 10. The plurality of seats are, for example, four seats including a driver seat, a passenger seat, and left and right rear seats. Note that the number of seats is not limited thereto. Hereinafter, a person seated on the driver seat is referred to as an occupant hm1, a person seated on the passenger seat is referred to as an occupant hm2, a person seated on the right side of the rear seat is referred to as an occupant hm3, and a person seated on the left side of the rear seat is referred to as an occupant hm4.

The audio system 5 includes a microphone MC1, a microphone MC2, a microphone MC3, a microphone MC4, an audio processing system 20, and an electronic device 30. The audio system 5 illustrated in FIG. 1 includes the number of microphones equal to the number of seats, that is, four microphones, but the number of microphones does not need to be equal to the number of seats.

The microphone MC1, the microphone MC2, the microphone MC3, and the microphone MC4 output audio signals to the audio processing system 20. Then, the audio processing system 20 outputs the voice recognition result to the electronic device 30. The electronic device 30 executes processing designated by the voice recognition result on the basis of the input voice recognition result.

The microphone MC1 is a microphone that collects a voice uttered by the occupant hm1. In other words, the microphone MC1 acquires an audio signal including an audio component uttered by the occupant hm1. The microphone MC1 is arranged, for example, on the right side of the overhead console. The microphone MC2 collects a voice uttered by the occupant hm2. In other words, the microphone MC2 is a microphone that acquires an audio signal including an audio component uttered by the occupant hm2. The microphone MC2 is arranged, for example, on the left side of the overhead console. That is, the microphone MC1 and the microphone MC2 are arranged at positions close to each other.

The microphone MC3 is a microphone that collects a voice uttered by the occupant hm3. In other words, the microphone MC3 acquires an audio signal including an audio component uttered by the occupant hm3. The microphone MC3 is arranged, for example, right at the center near the rear seat on the ceiling. The microphone MC4 is a microphone that collects a voice uttered by the occupant hm4. In other words, the microphone MC4 acquires an audio signal including an audio component uttered by the occupant hm4. The microphone MC4 is arranged, for example, left at the center near the rear seat on the ceiling. That is, the microphone MC3 and the microphone MC4 are arranged at positions close to each other.

Further, the arrangement positions of the microphone MC1, the microphone MC2, the microphone MC3, and the microphone MC4 illustrated in FIG. 1 are an example, and may be arranged at other positions.

Each microphone may be a directional microphone or an omnidirectional microphone. Each microphone may be a small micro electro mechanical systems (MEMS) microphone or may be an electret condenser microphone (ECM). Each microphone may be a beamformable microphone. For example, each microphone may be a microphone array having directivity in the direction of a corresponding seat and capable of collecting the voice from the directivity direction.

The audio system 5 illustrated in FIG. 1 includes a plurality of audio processing systems 20 corresponding to respective microphones. Specifically, the audio system 5 includes an audio processing system 21, an audio processing system 22, an audio processing system 23, and an audio processing system 24. The audio processing system 21 corresponds to the microphone MC1. The audio processing system 22 corresponds to the microphone MC2. The audio processing system 23 corresponds to the microphone MC3. The audio processing system 24 corresponds to the microphone MC4. Hereinafter, the audio processing system 21, the audio processing system 22, the audio processing system 23, and the audio processing system 24 may be collectively referred to as an audio processing system 20.

A signal output from the audio processing system 20 is input to the electronic device 30. The electronic device 30 executes processing corresponding to the signal output from the audio processing system 20. Here, the signal output from the audio processing system 20 is, for example, a voice command that is a command input by voice. The voice command is a signal that is specified by voice and controls a target device. In other words, the electronic device 30 executes processing corresponding to the voice command output from the audio processing system 20. For example, the electronic device 30 executes processing of opening and closing a window, processing related to driving of the vehicle 10, processing of changing the temperature of the air conditioner, and processing of changing the volume of the audio device on the basis of the voice command. The electronic device 30 is an example of the target device.

Although FIG. 1 illustrates a case where four people get on the vehicle 10, the number of people who get on the vehicle is not limited thereto. The number of passengers may be equal to or less than a maximum passenger capacity of the vehicle 10. For example, if the maximum passenger capacity of the vehicle 10 is six, the number of passengers may be six, or five or less.

Figure 2:
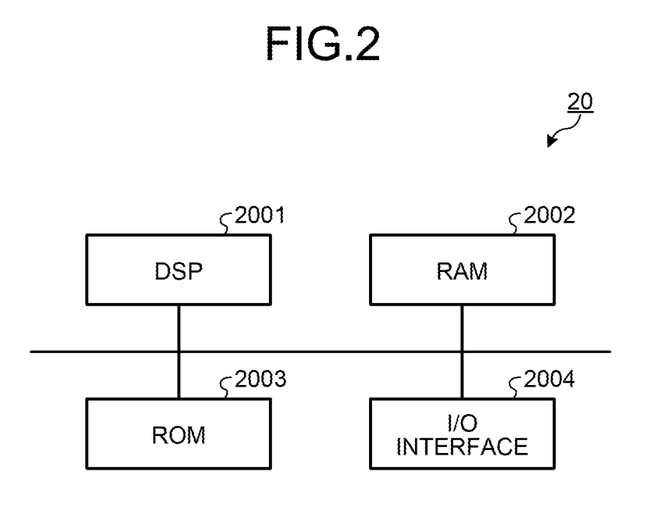
FIG. 2 is a diagram illustrating an example of a hardware configuration of an audio processing system according to the first embodiment.

FIG. 2 is a diagram illustrating an example of a hardware configuration of the audio processing system 20 according to the first embodiment. In the example illustrated in FIG. 2, the audio processing system 20 includes a digital signal processor (DSP) 2001, a random access memory (RAM) 2002, a read only memory (ROM) 2003, and an input/output (I/O) interface 2004.

The DSP 2001 is a processor capable of executing a computer program. Note that the type of the processor included in the audio processing system 20 is not limited to the DSP 2001. For example, the audio processing system 20 may be a central processing unit (CPU) or other hardware. Furthermore, the audio processing system 20 may include a plurality of processors.

The RAM 2002 is a volatile memory used as a cache, a buffer, or the like. Note that the type of the volatile memory included in the audio processing system 20 is not limited to the RAM 2002. The audio processing system 20 may include a register instead of the RAM 2002. The audio processing system 20 may include a plurality of volatile memories.

The ROM 2003 is a nonvolatile memory that stores various types of information including a computer program. The DSP 2001 implements the functions of the audio processing system 20 by reading a specific computer program from the ROM 2003 and executing the program. The function of the audio processing system 20 will be described later. Note that the type of the nonvolatile memory included in the audio processing system 20 is not limited to the ROM 2003. For example, the audio processing system 20 can include a flash memory instead of the ROM 2003. The audio processing system 20 may include a plurality of nonvolatile memories.

The I/O interface 2004 is an interface device to which an external device is connected. Here, the external device is, for example, a device such as the microphone MC1, the microphone MC2, the microphone MC3, the microphone MC4, or the electronic device 30. The audio processing system 20 may include a plurality of the I/O interfaces 2004.

As described above, the audio processing system 20 includes the memory in which the computer program is stored and the processor capable of executing the computer program. That is, the audio processing system 20 can be regarded as a computer. Note that the number of computers required to realize the function as the audio processing system 20 is not limited to one. The function as the audio processing system 20 may be realized by cooperation of two or more computers.

Figure 3:
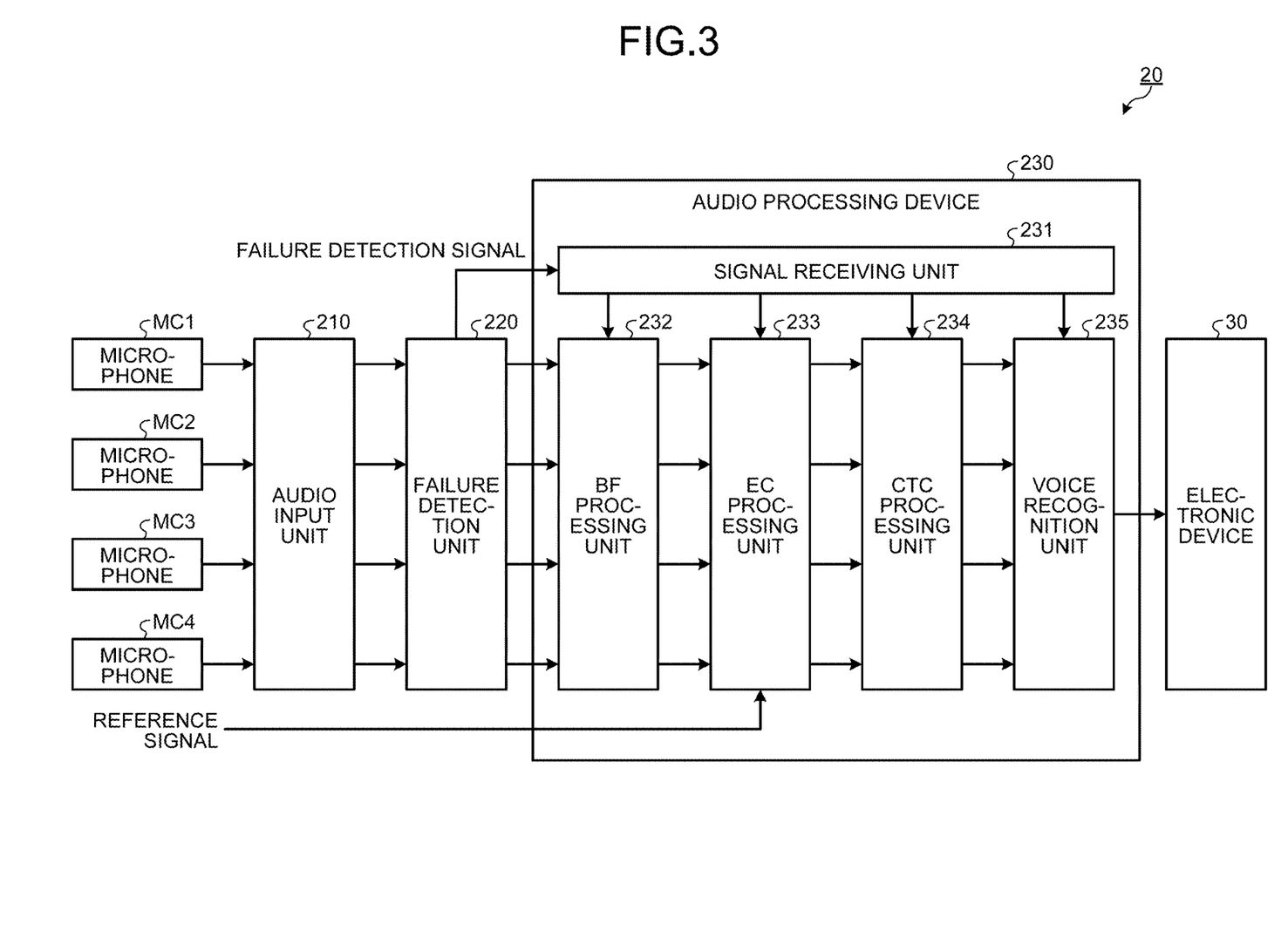
FIG. 3 is a block diagram illustrating an example of a configuration of the audio processing system according to the first embodiment.

FIG. 3 is a block diagram illustrating an example of a configuration of the audio processing system 20 according to the first embodiment. Audio signals are input to the audio processing system 20 from the microphone MC1, the microphone MC2, the microphone MC3, and the microphone MC4. Then, the audio processing system 20 outputs the voice recognition result to the electronic device 30. The audio processing system 20 includes an audio input unit 210, a failure detection unit 220, and an audio processing device 230.

The microphone MC1 generates an audio signal by converting a collected voice into an electric signal. Then, the microphone MC1 outputs the audio signal to the audio input unit 210. The audio signal is a signal including a voice of the occupant hm1, a voice of a person other than the occupant hm1, music emitted from an audio device, or noise such as traveling noise.

The microphone MC2 generates an audio signal by converting collected voice into an electric signal. Then, the microphone MC2 outputs the audio signal to the audio input unit 210. The audio signal is a signal including a voice of the occupant hm2, a voice of a person other than the occupant hm2, music emitted from an audio device, or noise such as traveling noise.

The microphone MC3 generates an audio signal by converting collected voice into an electric signal. Then, the microphone MC3 outputs the audio signal to the audio input unit 210. The audio signal is a signal including a voice of the occupant hm3, a voice of a person other than the occupant hm3, music emitted from an audio device, or noise such as traveling noise.

The microphone MC4 generates an audio signal by converting collected voice into an electric signal. Then, the microphone MC4 outputs the audio signal to the audio input unit 210. The audio signal is a signal including a voice of the occupant hm4, a voice of a person other than the occupant hm4, music emitted from an audio device, or noise such as traveling noise.

Audio signals are input to the audio input unit 210 from each of the microphone MC1, the microphone MC2, the microphone MC3, and the microphone MC4. That is, the audio input unit 210 receives a first voice that is a voice uttered by a first speaker. In other words, the audio input unit 210 receives a voice uttered by a first speaker of any one of the plurality of speakers. The audio input unit 210 is an example of the input unit. Then, the audio input unit 210 outputs the audio signal to the failure detection unit 220.

The failure detection unit 220 detects a failure of each of the microphone MC1, the microphone MC2, the microphone MC3, and the microphone MC4. In addition, the failure detection unit 220 determines whether or not a position of the first speaker can be identified. The failure detection unit 220 is an example of a determination unit. Here, the audio processing system 20 compares the audio signals output from each of the microphone MC1, the microphone MC2, the microphone MC3, and the microphone MC4 to identify the position of the speaker who has uttered the voice included in each audio signal. In some cases, the audio processing system 20 cannot identify the position of the speaker when any of the microphone MC1, the microphone MC2, the microphone MC3, and the microphone MC4 has failed. Therefore, the failure detection unit 220 detects the presence or absence of a failure in the plurality of microphones, and determines whether or not the position of the first speaker can be identified on the basis of the detection result.

Determination of the presence or absence of microphone failure will be specifically described. The microphone MC1 and the microphone MC2 are arranged at positions close to each other. Therefore, the sound pressure received by the microphone MC1 and the sound pressure received by the microphone MC2 are substantially the same. Therefore, the levels of the audio signals output from the microphone MC1 and the microphone MC2 are substantially the same. However, in a case where one of the microphone MC1 and the microphone MC2 fails, one of the microphone MC1 and the microphone MC2 cannot collect sound in a normal way. Therefore, a difference occurs in the levels of the audio signals output from the microphone MC1 and the microphone MC2. In a case where a difference between the level of the audio signal output from the microphone MC1 and the level of the audio signal output from the microphone MC2 is equal to or larger than a threshold, the failure detection unit 220 determines that a failure has occurred in one of the microphone MC1 and the microphone MC2. For example, the failure detection unit 220 determines that the microphone that has output the lower level audio signal out of the two audio signals has failed.

For the similar reason, in a case where a difference between the level of the audio signal output from the microphone MC3 and the level of the audio signal output from the microphone MC4 is equal to or larger than a threshold, the failure detection unit 220 determines that a failure has occurred in one of the microphone MC3 and the microphone MC4.

In a case where a failure is detected in at least one of the microphone MC1, the microphone MC2, the microphone MC3, and the microphone MC4, the failure detection unit 220 outputs a failure detection signal indicating that the failure has been detected. That is, the failure detection unit 220 outputs a failure detection signal indicating whether or not the position of the speaker who has uttered the voice received by the audio input unit 210 can be identified. The failure detection signal is an example of the first signal. Further, the failure detection unit 220 outputs audio signals output from the microphone MC1, the microphone MC2, the microphone MC3, and the microphone MC4 to the audio processing device 230.

The audio processing device 230 includes a signal receiving unit 231, a beam forming (BF) processing unit 232, an echo canceller (EC) processing unit 233, a cross talk canceller (CTC) processing unit 234, and a voice recognition unit 235.

The signal receiving unit 231 receives a failure detection signal indicating whether or not the position of the speaker who has uttered the voice received by the audio input unit 210 can be identified. The signal receiving unit 231 is an example of a receiving unit. The signal receiving unit 231 receives the failure detection signal from the failure detection unit 220. The signal receiving unit 231 transmits the failure detection signal to the BF processing unit 232, the EC processing unit 233, the CTC processing unit 234, and the voice recognition unit 235.

The BF processing unit 232 emphasizes the voice in the direction from the target seat by the directivity control.

The operation of the BF processing unit 232 will be described by exemplifying a case where a voice in the direction of the driver seat is emphasized among audio signals output from the microphone MC1. The microphone MC1 and the microphone MC2 are arranged at positions close to each other. Therefore, it is assumed that the audio signal output from the microphone MC1 includes voices of the occupant hm1 in the driver seat and the occupant hm2 in the passenger seat. Similarly, it is assumed that the audio signal output from the microphone MC2 includes voices of the occupant hm1 in the driver seat and the occupant hm2 in the passenger seat.

However, the microphone MC1 is farther from the passenger seat than the microphone MC2 is. Therefore, when the occupant hm2 in the passenger seat utters, the voice of the occupant hm2 in the passenger seat included in the audio signal output from the microphone MC1 is delayed from the voice of the occupant hm2 in the passenger seat included in the audio signal output from the microphone MC2. Therefore, the BF processing unit 232 emphasizes the voice in the direction of the target seat by applying the time delay processing to the audio signal, for example. Then, the BF processing unit 232 outputs the audio signal emphasizing the voice in the direction of the target seat to the EC processing unit 233. However, the method by which the BF processing unit 232 emphasizes the voice in the direction of the target seat is not limited to the above.

The EC processing unit 233 cancels an audio component other than the voice uttered by the speaker in the audio signal output from the BF processing unit 232. Here, the audio component other than the voice uttered by the speaker is, for example, music emitted by an audio device of the vehicle 10, traveling noise, or the like. In other words, the EC processing unit 233 executes echo cancellation processing.

More specifically, the EC processing unit 233 cancels the audio component specified by the reference signal from the audio signal output from the BF processing unit 232. As a result, the EC processing unit 233 cancels an audio component other than the voice uttered by the speaker. Here, the reference signal is a signal indicating the audio component other than the voice uttered by the speaker. For example, the reference signal is a signal indicating an audio component of music emitted by the audio device. As a result, the EC processing unit 233 can cancel the audio component other than the voice uttered by the speaker by canceling the audio component specified by the reference signal.

The CTC processing unit 234 cancels the voice emitted from any direction other than from the target seat. In other words, the CTC processing unit 234 executes crosstalk cancellation processing. The audio signals from all the microphones are input to the CTC processing unit 234 after undergoing echo cancellation processing by the EC processing unit 233. The CTC processing unit 234 cancels an audio component collected from any direction other than from the target seat by using, as a reference signal, an audio signal output from a microphone other than the microphone at the target seat among the input audio signals. That is, the CTC processing unit 234 cancels the audio component specified by the reference signal from the audio signal related to the microphone at the target seat. Then, the CTC processing unit 234 outputs the audio signal after the crosstalk cancellation processing to the voice recognition unit 235.

The voice recognition unit 235 outputs a voice command to the electronic device 30 on the basis of the audio signal and the failure detection signal. More specifically, the voice recognition unit 235 identifies a voice command included in the audio signal by executing voice recognition processing on the audio signal output from the CTC processing unit 234. Furthermore, the voice command includes a speaker position command that is a command related to the position of the speaker. The electronic device 30 executes processing corresponding to the speaker position command. The electronic device 30 executes, for example, processing of changing the temperature of the air conditioner, processing of changing the volume of the speaker, and processing of opening and closing the window on the basis of the speaker position command.

The speaker position command is a command in which processing to be executed is determined according to the position of the speaker. For example, when the occupant hm2 in the passenger seat utters "open the window", the voice recognition unit 235 determines that a voice in the utterance is a speaker position command indicating processing of opening the window on the left side of the passenger seat. Further, when the occupant hm3 in the right side seat of the rear seat utters "open the window", the voice recognition unit 235 determines that a voice in the utterance is a speaker position command indicating processing of opening the window on the right side of the rear seat.

Furthermore, the speaker position command includes a driving command related to driving. The driving command is a command related to driving of the vehicle 10. For example, when a device control related to driving of the vehicle 10 is performed by an utterance of the occupant hm3 at a rear seat, etc., who is not originally assumed to drive, there is a possibility that control may be performed in a way different from the intention of the occupant hm1 in the driver seat, resulting in being dangerous. Therefore, the voice recognition unit 235 is configured to be able to distinguish between the driving command and other speaker position commands. For example, the driving command is a command for controlling a car navigation system, a command for controlling a vehicle speed by accelerator control, or a command for controlling a vehicle speed by brake control.

Furthermore, the voice recognition unit 235 determines, on the basis of the microphone position to which the audio signal including the speaker position command has been input, from which position the audio signal has been uttered. The voice recognition unit 235 determines that the audio signal based on the microphone MC1 is a voice uttered from the direction of the driver seat. The voice recognition unit 235 determines that the audio signal based on the microphone MC2 is a voice uttered from the direction of the passenger seat.

The voice recognition unit 235 determines that the audio signal based on the microphone MC3 is a voice uttered from the direction of the right side of the rear seat. The voice recognition unit 235 determines that the audio signal based on the microphone MC4 is a voice uttered from the direction of the left side of the rear seat.

Furthermore, the voice recognition unit 235 determines whether or not the position of the speaker can be identified on the basis of the failure detection signal output from the failure detection unit 220. Here, in a case where any of the microphone MC1, the microphone MC2, the microphone MC3, and the microphone MC4 has failed, the BF processing unit 232 and the CTC processing unit 234 cannot execute processing in a normal way in some cases. For example, the microphone MC1 collects a voice uttered by the occupant hm1 in the driver seat and a voice uttered by the occupant hm2 in the passenger seat. If the microphone MC2 fails in this case, the BF processing unit 232 and the CTC processing unit 234 cannot execute processing in a normal way. That is, the CTC processing unit 234 cannot cancel the audio component of the voice that should have been collected by the microphone MC2 from the audio signal output from the microphone MC1. Therefore, the audio signal output from the microphone MC1 is input to the voice recognition unit 235 while both the voice uttered by the occupant hm1 in the driver seat and the voice uttered by the occupant hm2 in the passenger seat are included. In this case, the voice recognition unit 235 also treats a voice uttered by the occupant hm2 in the passenger seat included in the audio signal output from the microphone MC1 as a voice uttered by the occupant hm1 in the driver seat. Therefore, the voice recognition unit 235 determines whether or not the position of the speaker can be identified on the basis of the failure detection signal.

Here, in a case where the voice command included in the audio signal is determined to be the speaker position command, if the position of the speaker who has uttered the speaker position command cannot be identified, the voice recognition unit 235 cannot determine the speaker position command to be output. For example, in a case where it is determined that the audio signal includes the speaker position command "open the window", and the position of the speaker cannot be identified, the voice recognition unit 235 cannot specify which window is to be opened as the speaker position command to be output.

Therefore, the voice recognition unit 235 outputs, to the electronic device 30, a voice command that is specified by voice and is a signal for controlling the electronic device 30, and limits output of a speaker position command related to a position of a speaker among the voice commands in a case where the failure detection signal indicates that the position of the first speaker cannot be identified. The voice recognition unit 235 is an example of a voice recognition unit. In other words, the voice recognition unit 235 outputs, to the electronic device 30, a voice command that is specified by voice and is a signal for controlling the electronic device 30, and limits output of a speaker position command related to a position of a speaker among the voice commands in a case where the failure detection unit 220 determines that the position of the first speaker cannot be identified.

Next, a method of limiting the output of the speaker position command will be described.

For example, in a case where the failure detection unit 220 determines that the position of the speaker cannot be identified, the voice recognition unit 235 does not output the speaker position command. As a result, the electronic device 30 does not execute processing according to the speaker position command. Therefore, the voice recognition unit 235 can suppress execution of unintended processing by the electronic device 30.

Alternatively, in a case where the failure detection unit 220 detects the failure of the microphone, thereby determining that the position of the speaker cannot be identified, the voice recognition unit 235 limits the output of the speaker position command specified by the voice input from the microphone associated with the failed microphone. In other words, in a case where any microphone belonging to a group including a plurality of adjacent microphones fails, the voice recognition unit 235 does not output, to the electronic device 30, a speaker position command specified by a voice input from the other microphones belonging to the group. On the other hand, the voice recognition unit 235 does not limit the output of the speaker position command specified by the voice input from the microphone belonging to another group. That is, the voice recognition unit 235 outputs the speaker position command specified by the voice input from the microphone belonging to another group.

For example, the microphone MC1 and the microphone MC2 constitute a group. The audio input unit 210 receives the voice including the first voice output from the plurality of microphones including the first microphone and the second microphone associated with the first microphone. The first microphone is, for example, the microphone MC2. The second microphone is, for example, the microphone MC1. The first voice is, for example, a voice uttered by the occupant hm2 in the passenger seat. For example, the microphone MC1 collects a voice uttered by the occupant hm1 in the driver seat and a voice uttered by the occupant hm2 in the passenger seat. In this case, if the microphone MC2 fails, the BF processing unit 232 and the CTC processing unit 234 cannot execute processing in a normal way. Therefore, the audio signal based on the microphone MC1 is input to the voice recognition unit 235 while the voice uttered by the occupant hm1 in the driver seat and the voice uttered by the occupant hm2 in the passenger seat are included. Therefore, the voice recognition unit 235 may erroneously determine the voice uttered by the occupant hm2 in the passenger seat as the voice uttered by the occupant hm1 in the driver seat. On the other hand, since the microphone MC3 and the microphone MC4 are separated from the occupant hm1 in the driver seat and the occupant hm2 in the passenger seat, there is a low possibility that the voice uttered by the occupant hm1 in the driver's seat and the voice uttered by the occupant hm2 in the passenger seat are collected. Therefore, in a case where the failure detection unit 220 detects the failure of the first microphone and determines that the position of the first speaker cannot be identified, the voice recognition unit 235 does not output the speaker position command specified by the voice input from the second microphone among the speaker position commands. The first speaker is, for example, the occupant hm2 in the passenger seat.

Alternatively, in a case where the failure detection unit 220 determines that the position of the first speaker cannot be identified, the voice recognition unit 235 changes the priority of the output of the driving command related to driving among the speaker position commands. For example, when receiving a plurality of speaker position commands, the voice recognition unit 235 assigns the speaker position command to any one of priority levels divided into a plurality of levels. Then, the voice recognition unit 235 outputs a speaker position command with a priority higher than a threshold to the electronic device 30. That is, the voice recognition unit 235 causes the electronic device 30 to preferentially execute the speaker position command. On the other hand, the voice recognition unit 235 does not output a speaker position command with a priority lower than the threshold to the electronic device 30. As described above, in a case where the failure detection unit 220 determines that the position of the speaker cannot be specified, the voice recognition unit 235 changes the priority of the output of the driving command.

For example, in a case where the failure detection unit 220 determines that the position of the first speaker cannot be specified, the voice recognition unit 235 increases the priority of the output of the driving command. As a result, when any microphone fails, the voice recognition unit 235 prevents the operation related to driving by voice from being disabled.

Alternatively, in a case where the failure detection unit 220 determines that the position of the speaker cannot be identified, the voice recognition unit 235 decreases the priority of the output of the driving command. As a result, when any microphone fails, the voice recognition unit 235 prevents an operation related to driving from being performed by a voice of a person not originally related to driving, such as the occupant hm4 in the rear seat.

Figure 4:
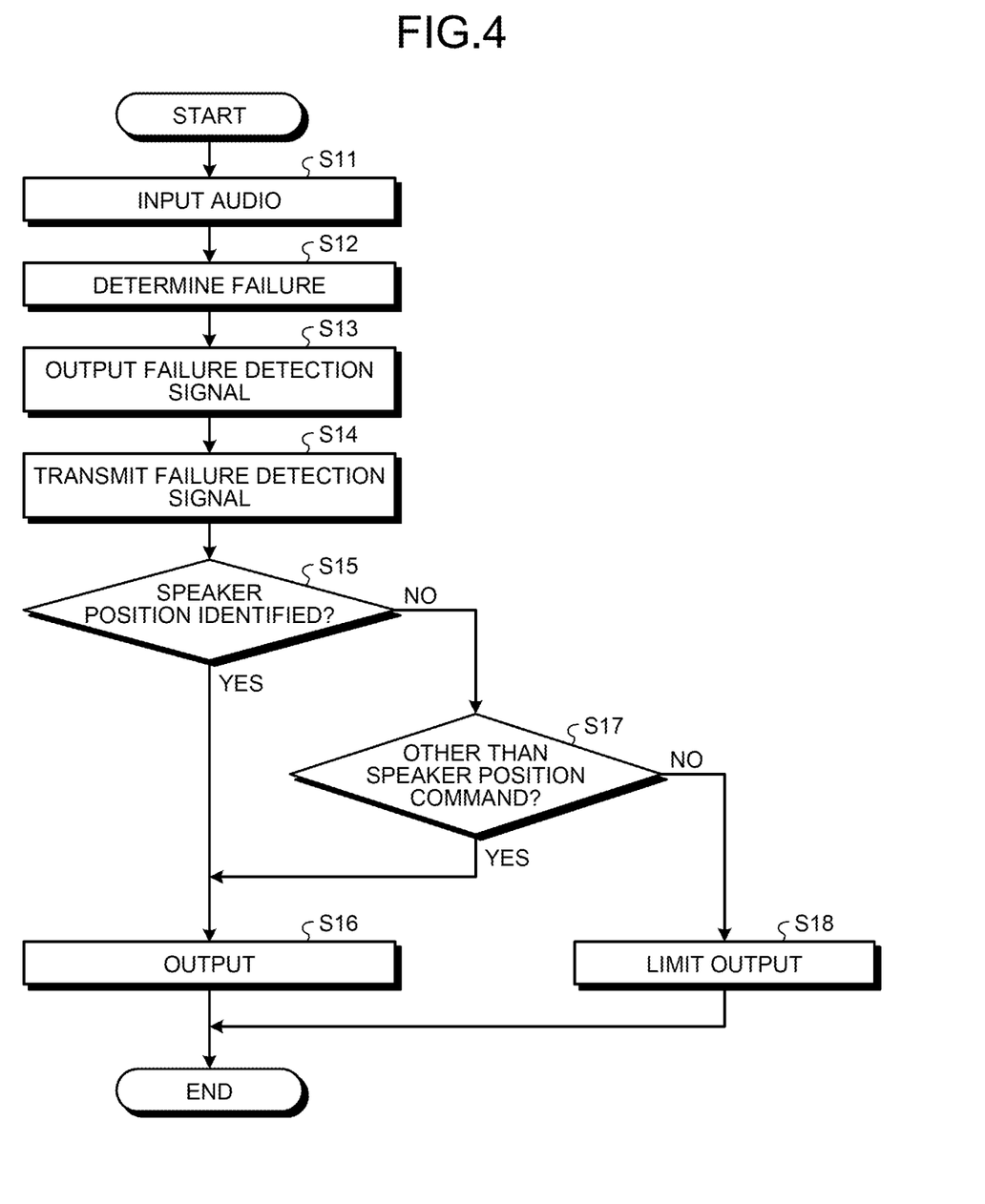
FIG. 4 is a flowchart illustrating an example of an operation of the audio processing system according to the first embodiment.

Next, an operation of the audio processing system 20 according to the first embodiment will be described. FIG. 4 is a flowchart illustrating an example of an operation of the audio processing system 20 according to the first embodiment.

The audio input unit 210 receives audio signals from the microphone MC1, the microphone MC2, the microphone MC3, and the microphone MC4 (Step S11).

The failure detection unit 220 determines whether or not any one of the microphone MC1, the microphone MC2, the microphone MC3, and the microphone MC4 has failed on the basis of the audio signal output from the audio input unit 210 (Step S12).

The failure detection unit 220 outputs a failure detection signal indicating whether or not any of the microphone MC1, the microphone MC2, the microphone MC3, and the microphone MC4 has failed to the signal receiving unit 231 of the audio processing device 230 (Step S13).

The signal receiving unit 231 transmits the failure detection signal indicating whether or not any of the microphone MC1, the microphone MC2, the microphone MC3, and the microphone MC4 has failed to the BF processing unit 232, the EC processing unit 233, the CTC processing unit 234, and the voice recognition unit 235 (Step S14).

The voice recognition unit 235 determines whether or not the position of the speaker of the voice included in the audio signal input via the BF processing unit 232, the EC processing unit 233, and the CTC processing unit 234 can be identified on the basis of the failure detection signal output from the signal receiving unit 231 (Step S15).

In a case where the position of the speaker can be specified (Yes in Step S15), the voice recognition unit 235 outputs the voice command included in the audio signal to the electronic device 30 (Step S16). As a result, the voice recognition unit 235 causes the electronic device 30 to execute processing specified by the voice command.

In a case where the position of the speaker cannot be identified (No in Step S15), the voice recognition unit 235 determines whether or not the voice command included in the audio signal is a command other than the speaker position command (Step S17). In a case where the command is a command other than the speaker position command (Yes in Step S17), the voice recognition unit 235 proceeds to Step S16.

In a case where the command included in the audio signal is the speaker position command (No in Step S17), the voice recognition unit 235 limits the output of the speaker position command (Step S18). That is, as shown in Step S16, the voice recognition unit 235 outputs, to the electronic device 30, a voice command that is specified by voice and is a signal for controlling the target device. However, in a case where it is determined in Step S15 that the position of the first speaker cannot be specified, the voice recognition unit 235 limits the output of the speaker position command related to the position of the speaker among the voice commands. As a result, a voice recognition unit 235*a* limits execution of processing specified by the voice command.

As described above, the audio processing system 20 ends the processing.

As described above, according to the first embodiment, the audio input unit 210 receives the first voice uttered by the first speaker who is any one of the plurality of speakers. The failure detection unit 220 determines whether or not it is possible to identify the position of the first speaker who has uttered the first voice received by the audio input unit 210 by detecting a failure of the microphone MC1, the microphone MC2, the microphone MC3, and the microphone MC4. Then, the voice recognition unit 235 which is specified by voice, and outputs, to the electronic device 30, a voice command that is a signal for controlling the target device, limits output of a speaker position command related to a position of a speaker among the voice commands specified by voice, when determining that the position of the first speaker cannot be identified. This causes the execution of unintended processing to be restricted, and the audio processing system 20 can execute appropriate processing even in a case where the position of the speaker cannot be identified.

Second Embodiment

Next, an audio processing system 20*a* according to a second embodiment will be described. In the second embodiment, matters different from those of the first embodiment will be described, and the same matters as those of the first embodiment will be briefly described or description thereof will be omitted.

Figure 5:
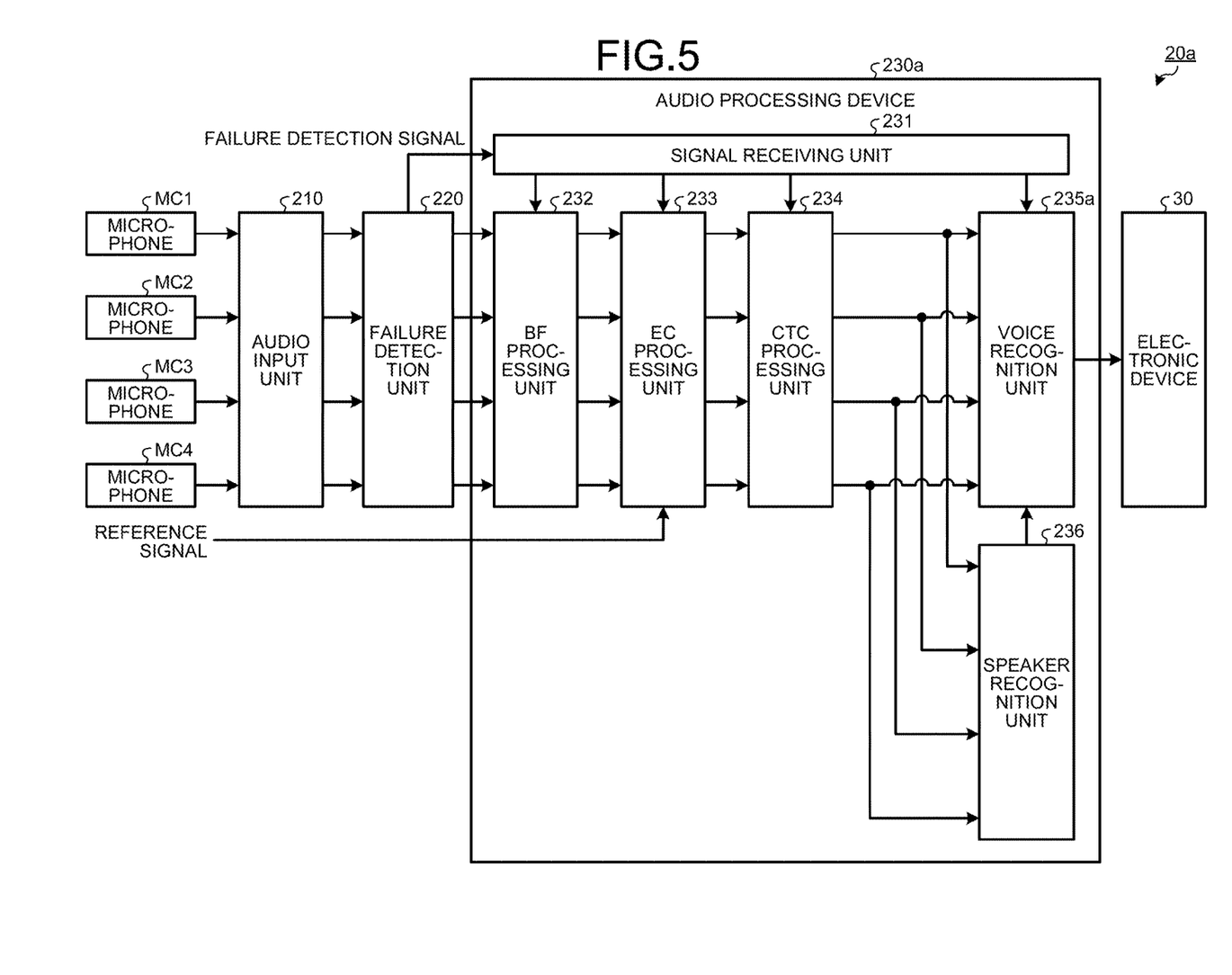
FIG. 5 is a block diagram illustrating an example of a configuration of an audio processing system according to a second embodiment.

FIG. 5 is a block diagram illustrating an example of a configuration of the audio processing system 20*a* according to the second embodiment. An audio processing device 230*a* of the audio processing system 20*a* in the second embodiment is different from the audio processing system 20 in the first embodiment in that a speaker recognition unit 236 is provided.

The speaker recognition unit 236 determines whether or not the first voice that is a voice uttered by the first speaker who is any one of the plurality of speakers is a voice of a registrant registered in advance. The speaker recognition unit 236 is an example of a speaker determination unit. More specifically, the speaker recognition unit 236 compares the audio signal of the registrant registered in advance with the audio signal output from the CTC processing unit 234 to determine whether the voice included in the audio signal output from the CTC processing unit 234 is a voice based on the utterance of the registrant registered in advance. For example, the speaker recognition unit 236 determines whether the voice included in the audio signal is the voice of the owner of the vehicle 10. Then, the speaker recognition unit 236 outputs a recognition result signal indicating whether or not the speaker who has uttered the voice included in the audio signal has been determined to be the registrant to the voice recognition unit 235*a*.

The voice recognition unit 235*a* outputs the speaker position command on condition that the speaker recognition unit 236 has determined that the first voice is an utterance by the registrant. More specifically, in a case where the failure detection unit 220 determines that the position of the speaker can be identified, the voice recognition unit 235*a* outputs the speaker position command regardless of whether or not the utterance is made by the registrant registered in advance. Furthermore, in a case where the failure detection unit 220 determines that the position of the speaker cannot be identified, the voice recognition unit 235*a* outputs the speaker position command on condition that the speaker recognition unit 236 has recognized that the utterance is made by the registrant. For example, the voice recognition unit 235*a* executes the processing of the speaker position command on condition that the voice is the voice of the owner of the vehicle 10 registered in advance. On the other hand, in a case where the failure detection unit 220 determines that the position of the speaker cannot be identified, the voice recognition unit 235*a* limits the output of the speaker position command on condition that the speaker recognition unit 236 has recognized that the utterance is made by the registrant.

Figure 6:
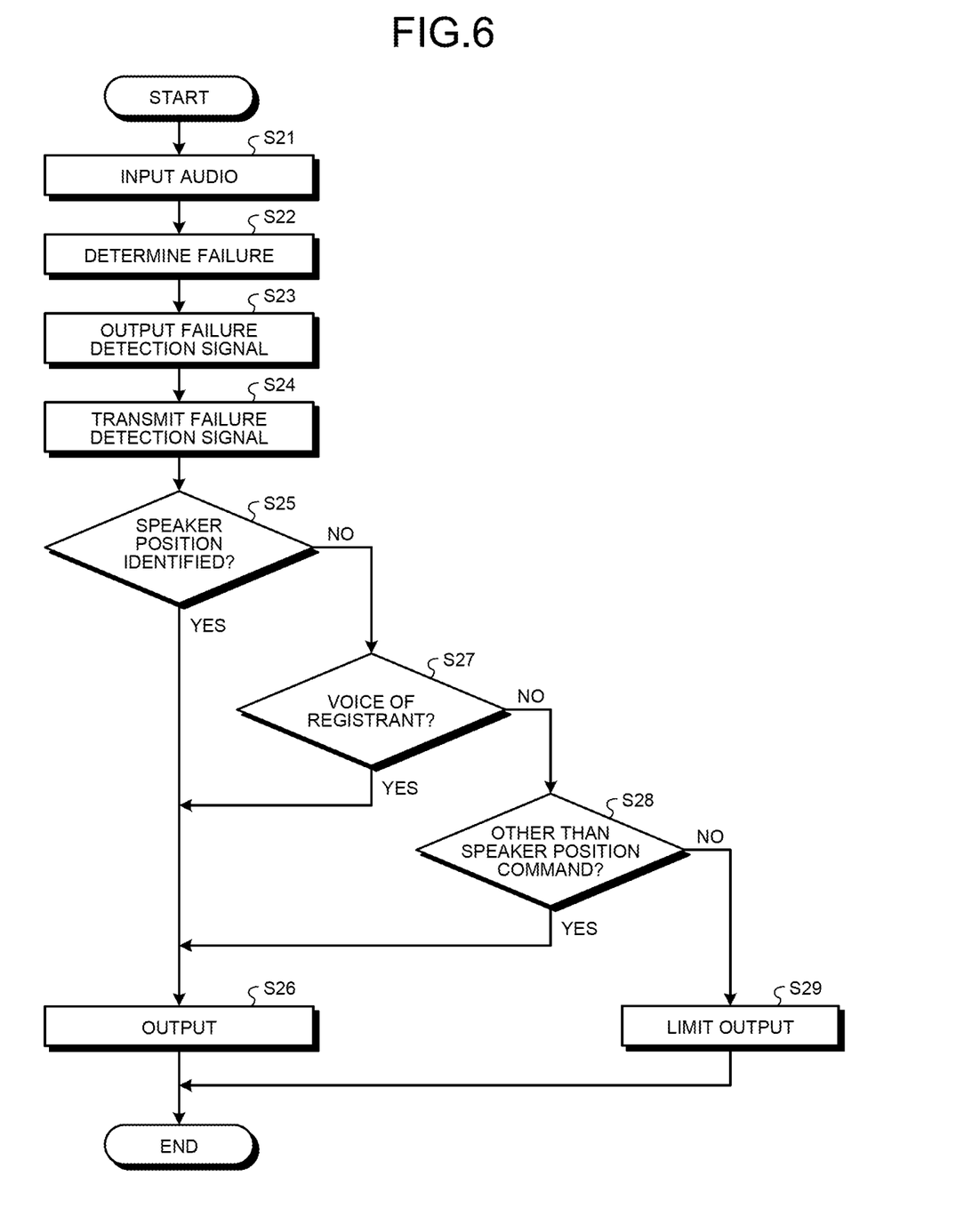
FIG. 6 is a flowchart illustrating an example of an operation of the audio processing system according to the second embodiment.

Next, an operation of the audio processing system 20*a* according to the second embodiment will be described. FIG. 6 is a flowchart illustrating an example of an operation of the audio processing system 20*a* according to the second embodiment.

The audio input unit 210 receives audio signals from the microphone MC1, the microphone MC2, the microphone MC3, and the microphone MC4 (Step S21).

The failure detection unit 220 determines whether or not any one of the microphone MC1, the microphone MC2, the microphone MC3, and the microphone MC4 has failed on the basis of the audio signal output from the audio input unit 210 (Step S22).

The failure detection unit 220 outputs the failure detection signal indicating whether or not any of the microphone MC1, the microphone MC2, the microphone MC3, and the microphone MC4 has failed to the signal receiving unit 231 of the audio processing device 230*a* (Step S23).

The signal receiving unit 231 transmits the failure detection signal indicating whether or not the microphone MC1, the microphone MC2, the microphone MC3, or the microphone MC4 has failed to the BF processing unit 232, the EC processing unit 233, the CTC processing unit 234, and the voice recognition unit 235*a* (Step S24).

The voice recognition unit 235*a* determines whether or not the position of the speaker of the voice included in the audio signal input via the BF processing unit 232, the EC processing unit 233, and the CTC processing unit 234 can be identified on the basis of the failure detection signal output from the signal receiving unit 231 (Step S25).

In a case where the position of the speaker can be identified (Yes in Step S25), the voice recognition unit 235a outputs the voice command included in the audio signal to the electronic device 30 (Step S26). As a result, the voice recognition unit 235a causes the electronic device 30 to execute processing specified by the voice command.

In a case where the position of the speaker cannot be identified (No in Step S25), the voice recognition unit 235a determines whether or not the voice included in the audio signal is the utterance made by the registrant on the basis of the recognition result signal (Step S27).

In a case where the voice included in the audio signal is based on the utterance of the registrant (Yes in Step S27), the voice recognition unit 235a proceeds to Step S26.

In a case where the voice included in the audio signal is not the utterance made by the registrant (No in Step S27), the voice recognition unit 235a determines whether or not the voice command included in the audio signal is a command other than the speaker position command (Step S28). In a case where the voice command included in the audio signal is a command other than the speaker position command (Yes in Step S28), the voice recognition unit 235a proceeds to Step S26.

In a case where the voice command included in the audio signal is the speaker position command (No in Step S28), the voice recognition unit 235a limits the output of the speaker position command (Step S29). As a result, the voice recognition unit 235a limits execution of processing specified by the voice command.

As described above, the audio processing system 20a ends the processing.

As described above, according to the second embodiment, the speaker recognition unit 236 determines whether or not the first voice uttered by the first speaker who is any one of the plurality of speakers is a voice of a registrant registered in advance. Then, the voice recognition unit 235a outputs, to the electronic device 30, the speaker position command on condition that the speaker recognition unit 236 has determined that the first voice is a voice made by the registrant. As a result, the electronic device 30 executes the processing of the speaker position command on condition that the voice is uttered by a specific registrant such as the owner of the vehicle 10. On the other hand, in a case of a voice uttered by a person other than the registrant, the voice recognition unit 235a limits the output of the speaker position command. This causes the execution of unintended processing to be restricted, and the audio processing system 20a can execute appropriate processing even in a case where the position of the speaker cannot be identified.

(First Modification)

A first modification of the first embodiment or the second embodiment will be described.

The audio processing device 230 in the first embodiment and the audio processing device 230a in the second embodiment include the CTC processing unit 234. However, the audio processing device 230 and the audio processing device 230a does not need to include the CTC processing unit 234. In addition, the audio processing device 230 illustrated in FIG. 3 and the audio processing device 230a illustrated in FIG. 5 include the EC processing unit 233 at a subsequent stage of the BF processing unit 232. However, the audio processing device 230 and the audio processing device 230a may include the BF processing unit 232 at a subsequent stage of the EC processing unit 233.

(Second Modification)

A second modification of the first embodiment or the second embodiment will be described.

In a case where the microphone MC3 or the microphone MC4 installed near the rear seat illustrated in FIG. 1 fails, the audio processing device 230 according to the first embodiment and the audio processing device 230a according to the second embodiment may execute partial multi-zone sound collection with a non-failed microphone. Specifically, if the microphone MC3 fails, the audio processing device 230 and the audio processing device 230a collect the voice in the rear seat using the microphone MC4. Alternatively, if the microphone MC4 fails, the audio processing device 230 and the audio processing device 230a collect the voice in the rear seat using the microphone MC3.

In the first embodiment, the second embodiment, and the first and second modifications thereof, it has been described that the functions of the audio processing system 20 and the audio processing system 20a are implemented by the DSP 2001 executing a specific computer program. A computer program for causing a computer to realize the functions of the audio processing system 20 and the audio processing system 20a can be provided by being stored in advance in the ROM 2003. The computer program for causing a computer to realize the functions of the audio processing system 20 and the audio processing system 20a may be provided by being recorded as a file in an installable format or an executable format in a computer-readable recording medium such as a compact disc read only memory (CD-ROM), a flexible disk (FD), a compact disc recordable (CD-R), a digital versatile disk (DVD), a universal serial bus (USB) memory, or a secure digital (SD) card.

Furthermore, a computer program for causing a computer to realize the functions of the audio processing system 20 and the audio processing system 20a may be stored on a computer connected to a network such as the Internet and provided by being downloaded via the network. Furthermore, a computer program for causing a computer to realize the functions of the audio processing system 20 and the audio processing system 20a may be provided or distributed via a network such as the Internet.

In addition, some or all of the functions of the audio processing system 20 and the audio processing system 20a may be realized by a logic circuit. Some or all of the functions of the audio processing system 20 and the audio processing system 20a may be realized by an analog circuit. Some or all of the functions of the audio processing system 20 and the audio processing system 20a may be realized by a field-programmable gate array (FPGA), an application specific integrated circuit (ASIC), or the like.

Although several embodiments of the present disclosure have been described, these embodiments have been presented as examples, and are not intended to limit the scope of the invention. These embodiments can be implemented in various other forms, and various omissions, substitutions, and changes can be made without departing from the gist of the invention. These embodiments and modifications thereof are included in the scope and gist of the invention and are included in the invention described in the claims and the equivalent scope thereof.

According to the present disclosure, it is possible to execute appropriate processing even in a case where a position of a speaker cannot be identified in an audio processing system.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An audio processing system comprising:
   a memory; and
   a processor that is coupled to the memory, and, when executing a program stored in the memory, performs:
   receiving a first voice that is a voice uttered by a first speaker;
   determining whether or not a position of the first speaker can be identified; and
   outputting, to a target device, a voice command that is specified by a voice and is a signal for controlling the target device, the processor limiting output of a speaker position command related to a position of a speaker among the voice command in a case where the processor determines that the position of the first speaker cannot be identified,
   wherein the processor raises a priority of an output of a driver seat command related to a driver seat among the speaker position command in a case where the processor determines that the position of the first speaker cannot be identified.

2. The audio processing system according to claim 1, wherein the processor does not output the speaker position command in a case where the processor determines that the position of the first speaker cannot be identified.

3. The audio processing system according to claim 1, wherein
   the processor receives a voice including the first voice output from a plurality of microphones including a first microphone and a second microphone associated with the first microphone,
   the processor performs detection of presence or absence of a failure in the plurality of microphones, and determines whether or not a position of the first speaker can be identified based on a result of the detection, and
   the processor does not output a speaker position command specified by a voice input from the second microphone among the speaker position command in a case where the processor detects a failure of the first microphone and determines that the position of the first speaker cannot be identified.

4. The audio processing system according to claim 3, wherein the processor further performs comparing audio signals of the plurality of microphones, to identify the position of the first speaker who has uttered the first voice.

5. The audio processing system according to claim 3, wherein the processor determines that the failure has occurred in a case where a difference between a level of an audio signal output from the first microphone and a level of an audio signal output from the second microphone is equal to or larger than a threshold.

6. The audio processing system according to claim 1, wherein
   the processor further performs determining whether the first voice is a voice of a registrant registered in advance, and
   the processor outputs the speaker position command on condition that the processor determines that the first voice is a voice of the registrant.

7. The audio processing system according to claim 6, wherein the processor outputs the speaker position command in which processing to be executed is determined according to the position of the speaker.

8. The audio processing system according to claim 6, wherein in a case where the processor detects a failure of a microphone, thereby determining that the position of the speaker cannot be identified, the processor limits the output of the speaker position command of a voice input from a microphone associated with the failed microphone.

9. The audio processing system according to claim 1, wherein the processor further performs directivity control to emphasize a voice in a direction from a target.

10. The audio processing system according to claim 1, wherein the processor further performs cancelling an audio component other than a voice uttered by a speaker, based on a reference signal indicating a specific audio component.

11. The audio processing system according to claim 1, wherein the processor further performs cancellation processing of canceling a voice from a direction other than a direction from a target.

12. An audio processing method comprising:
    an inputting step that receives a first voice uttered by a first speaker;
    a determining step that determines whether or not a position of the first speaker can be identified; and
    an outputting step that outputs, to a target device, a voice command that is specified by a voice and is a signal for controlling the target device, wherein
    the outputting step limits output of a speaker position command related to a position of a speaker among the voice command in a case where it is determined, in the determining step, that the position of the first speaker cannot be identified,
    wherein the processor raises a priority of an output of a driver seat command related to a driver seat among the speaker position command in a case where the processor determines that the position of the first speaker cannot be identified.

* * * * *